(12) United States Patent
Hoff et al.

(10) Patent No.: US 8,496,135 B2
(45) Date of Patent: *Jul. 30, 2013

(54) METHOD AND APPARATUS FOR ADMINISTERING MICRO-INGREDIENT FEED ADDITIVES TO ANIMAL FEED RATIONS

(75) Inventors: Charles H. Hoff, Bellvue, CO (US); Greg Moore, Evans, CO (US)

(73) Assignee: Animal Health International, Inc., Greeley, CO (US)

( * ) Notice: Subject to any disclaimer, the term of this patent is extended or adjusted under 35 U.S.C. 154(b) by 831 days.

This patent is subject to a terminal disclaimer.

(21) Appl. No.: 12/147,298

(22) Filed: Jun. 26, 2008

(65) Prior Publication Data

US 2008/0283551 A1  Nov. 20, 2008

Related U.S. Application Data

(60) Continuation of application No. 11/684,146, filed on Mar. 9, 2007, now Pat. No. 7,410,078, which is a division of application No. 10/856,095, filed on May 28, 2004, now Pat. No. 7,240,807.

(51) Int. Cl.
*B67C 11/00* (2006.01)

(52) U.S. Cl.
USPC ............ 222/1; 222/56; 222/77; 222/413; 222/462; 220/567

(58) Field of Classification Search
USPC ............ 222/1, 56, 58, 77, 413, 129, 132, 222/135, 148, 460, 462; 366/141; 177/64, 177/116; 141/83; 220/565, 567
See application file for complete search history.

(56) References Cited

U.S. PATENT DOCUMENTS

| | | | | |
|---|---|---|---|---|
| 2,587,531 | A | * | 2/1952 | Saxe .................................. 366/8 |
| 2,675,947 | A | * | 4/1954 | Wynn ............................ 222/505 |
| 3,091,368 | A | * | 5/1963 | Harley et al. .................... 222/56 |
| 3,191,807 | A | | 6/1965 | Rodrigues, Jr. |
| 3,437,075 | A | | 4/1969 | Hawes, Jr. et al. |
| 3,498,311 | A | | 3/1970 | Hawes, Jr. |
| 3,670,923 | A | | 6/1972 | Hawes, Jr. et al. |
| 3,741,440 | A | | 6/1973 | Sanders, Jr. |
| 3,804,303 | A | | 4/1974 | Fassauer |
| 3,806,001 | A | | 4/1974 | Pratt |

(Continued)

OTHER PUBLICATIONS

Motionless Mixer—A series (Inline) product information sheet, Komax Systems, Inc., date unknown. cited by other.

(Continued)

*Primary Examiner* — J. Casimer Jacyna

(74) *Attorney, Agent, or Firm* — Sheridan Ross PC

(57) ABSTRACT

A method and apparatus are provided for administering micro-ingredient feed additives to animal feed rations. The apparatus may be referred to as a system which includes a number of discrete components which cooperate together to ultimately deliver micro-ingredients to a desired location, such as a feed mixer containing a feed ration. Structure is provided for storing, measuring, dispensing, and conveying the micro-ingredients. Measuring of the micro-ingredients may be achieved by loss in weight, gain in weight, or volumetric metering methods. Transport by a liquid carrier such as water may be achieved by providing one or a plurality of conveyance pumps connected to a transport line. The system is operated by a control unit which controls components of the system to achieve delivery of specified amounts and types of micro-ingredients to the feed ration.

12 Claims, 18 Drawing Sheets

U.S. PATENT DOCUMENTS

| | | | |
|---|---|---|---|
| 3,822,056 A | 7/1974 | Hawes, Jr. et al. | |
| 3,901,483 A | * 8/1975 | Lasar | 366/193 |
| 3,981,417 A | 9/1976 | Fassauer | |
| 4,733,971 A | 3/1988 | Pratt | |
| 4,801,210 A | 1/1989 | Gian | |
| 4,815,042 A | 3/1989 | Pratt | |
| 4,889,433 A | 12/1989 | Pratt | |
| 4,910,024 A | 3/1990 | Pratt | |
| 5,219,224 A | 6/1993 | Pratt | |
| 5,280,859 A | 1/1994 | Rust et al. | |
| 5,340,211 A | 8/1994 | Pratt | |
| 5,369,032 A | 11/1994 | Pratt | |
| 5,401,501 A | 3/1995 | Pratt | |
| 5,423,456 A | 6/1995 | Arendonk et al. | |
| 5,487,603 A | 1/1996 | Hoff et al. | |
| 5,634,716 A | 6/1997 | Westall et al. | |
| 5,673,647 A | 10/1997 | Pratt | |
| 5,718,507 A | 2/1998 | Gian | |
| 5,853,244 A | 12/1998 | Hoff et al. | |
| 5,899,561 A | 5/1999 | Gian | |
| 6,203,184 B1 | 3/2001 | O'Callaghan | |
| 6,250,793 B1 | 6/2001 | Gian | |
| 6,329,001 B1 | 12/2001 | Ivey et al. | |
| 2004/0194206 A1 | * 10/2004 | Kieturakis et al. | 4/661 |

OTHER PUBLICATIONS

The Ejector Venturi Scrubber product information sheet, available at http://www.s-k.com/content/products/scrub.sub.--sys/c.sub.--scrub.htm, downloaded Dec. 19, 2002. cited by other.

J.S. Melbourne Controls, Pty Ltd, "Melbourne Hydro-Shear Mixer," pp. 1-9, Mar. 2000. cited by other.

Solt, "Designing a pressure conveying system fed by a venturi," pp. 17-22, Powder and Bulk Engineering, Jul. 2001. cited by other.

* cited by examiner

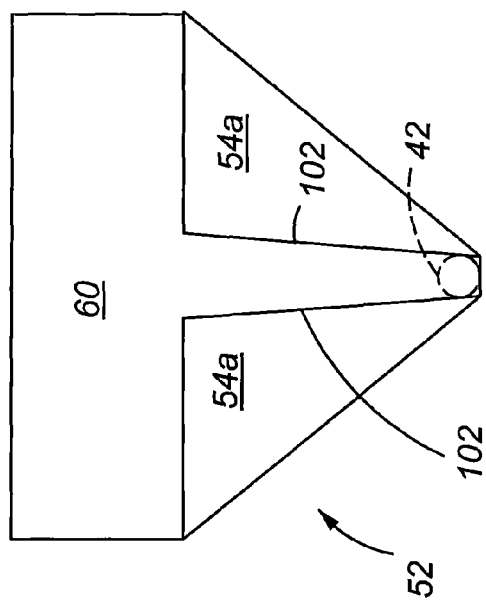
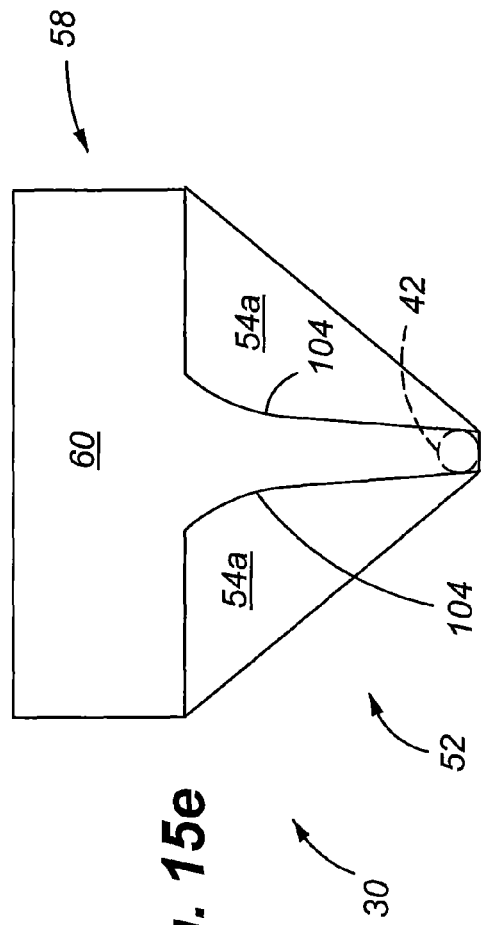
Fig. 15d
Fig. 15e

METHOD AND APPARATUS FOR ADMINISTERING MICRO-INGREDIENT FEED ADDITIVES TO ANIMAL FEED RATIONS

CROSS-REFERENCE TO RELATED APPLICATIONS

This Application is a Continuation of U.S. patent application Ser. No. 11/684,146, filed on Mar. 9, 20007, entitled "Method and Apparatus for Administering Micro-Ingredient Feed Additives to Animal Feed Rations", which is a Divisional Application of U.S. patent application Ser. No. 10/856,095, filed on May 28, 2004, entitled "Method and Apparatus for Administering Micro-Ingredient Feed Additives to Animal Feed" now U.S. Pat. No. 7,240,807.

FIELD OF THE INVENTION

The present invention relates to methods and apparatus for adding micro-ingredients to feed rations for animals such as livestock, and more particularly, to a product collection tank used in a system for administering micro-ingredient feed additives to a feed ration.

BACKGROUND OF THE INVENTION

Providing animals with various dietary supplements and medications such as vitamins, minerals, enzymes, hormones, and antibiotics is a common and well known practice in the livestock and poultry industries. The manner in which these supplements are mixed together and added to a consumptive fluid carrier such as water is disclosed in a number of patents, including the U.S. Pat. Nos. 4,889,443; 4,815,042; 4,733,971; and 5,219,224.

In these references as well as many others, it is known to utilize automated systems which dispense discrete amounts of micro-ingredients, mix the micro-ingredients, and then deliver the micro-ingredients to a feed ration, typically in a slurry mixture form. The prepared slurry may be fed directly to the animals, or may be added to the animal feed rations using mixing or spraying methods.

One step in traditional approaches of manipulating micro-ingredients which can be eliminated is the mixing of the multiple micro-ingredients prior to addition of the micro-ingredients to a feed ration. Feed rations are typically stored in large batch-feed mixers prior to delivery of the rations to a feed truck which then distributes the feed to bunk feeders for consumption by animals. It has been found through various trials that mixing of the feed ration which inherently takes place at the batch feed mixers is adequate for also mixing and dispersing micro-ingredients throughout the feed ration. By requiring use of a mixer within a micro-ingredient dispensing system, the mixer itself is an additional piece of equipment which must be maintained and cleaned, and adds to the overall cost and complexity of the system.

Features and advantages of the present invention will become apparent by a review of the accompanying drawings taken along with the detailed description.

BRIEF DESCRIPTION OF THE DRAWINGS

Several drawings have been developed to assist with understanding the invention. Following is a brief description of the drawings that illustrate the invention and its various embodiments.

FIGS. 15B-15E are front elevation views of modifications of the device shown in FIG. 2;

While the following disclosure describes the invention in connection with those embodiments presented, one should understand that the invention is not strictly limited to these embodiments. Furthermore, one should understand that the drawings are not necessarily to scale, and that in certain instances, the disclosure may not include details which are not necessary for an understanding of the present invention, such as conventional details of fabrication and assembly.

DETAILED DESCRIPTION

Figure 1:
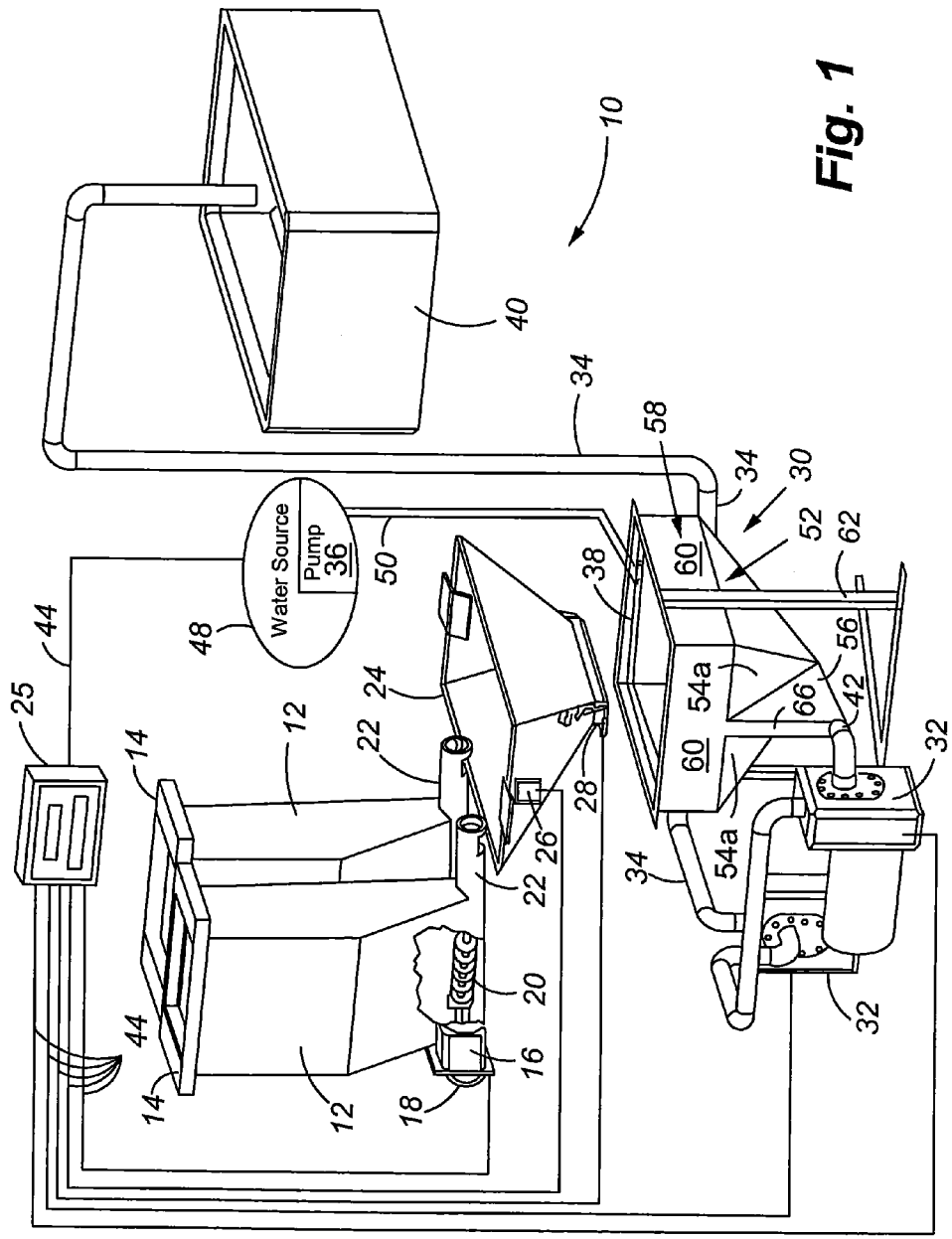
FIG. 1 is a schematic view comprising one preferred embodiment of the present invention.
Figure 2:
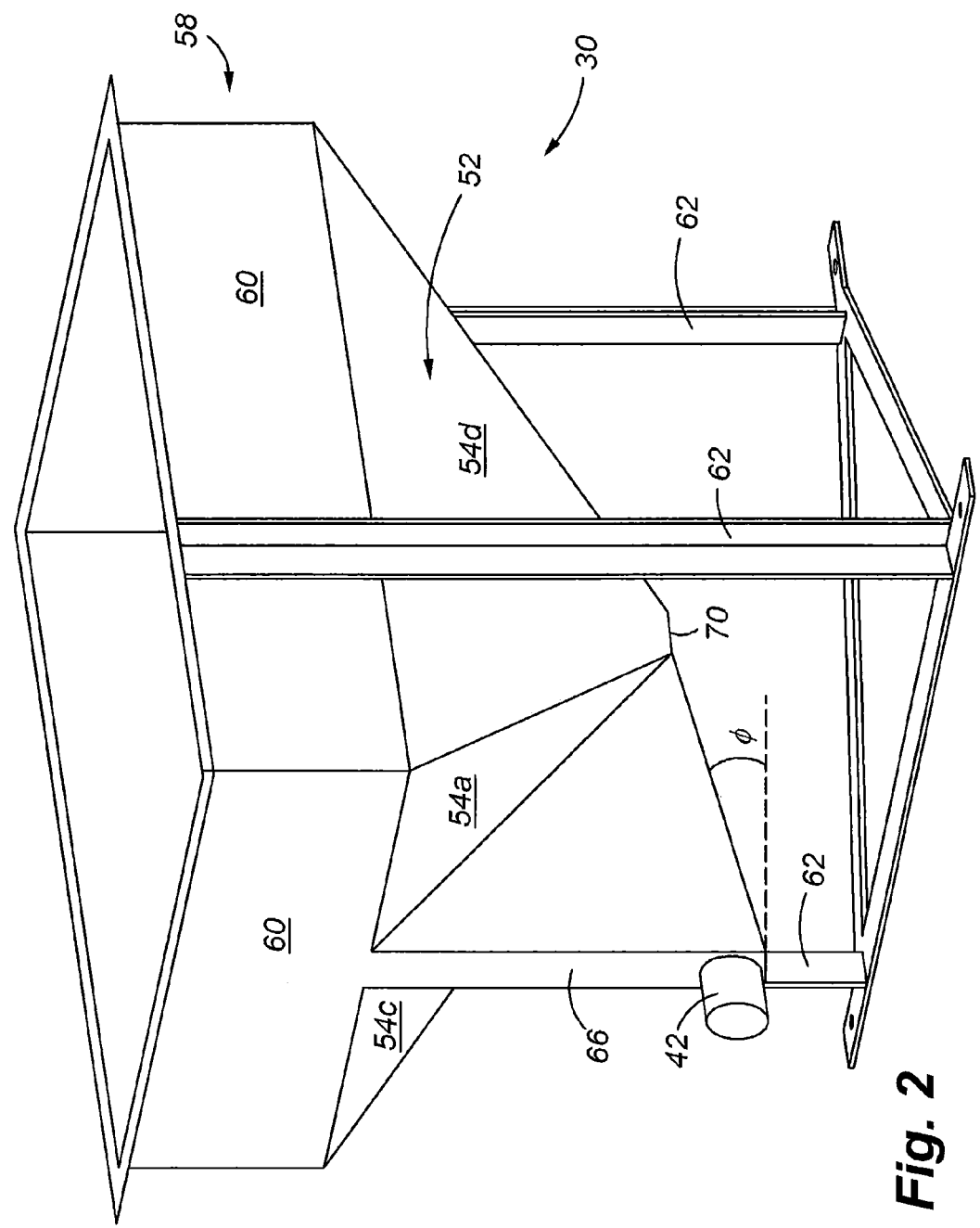
FIG. 2 is a perspective view of the product collection tank shown in FIG. 1.

FIG. 1 illustrates one embodiment of the system 10 of the present invention which is specifically designed for storing, dispensing, measuring, and delivering micro-ingredients from an initial location where each of the micro-ingredients are stored, to a desired location such as a feed mixer containing a feed ration. Initially, the micro-ingredients are stored in one or more storage bins 12. The bins may have an open upper end 14 or a closed upper end having a reclosable lid (not shown). Means are provided for dispensing the micro-ingredients from the bins 12 to a weigh hopper 24 as shown in FIG. 1. One manner in which the micro-ingredients may be dispensed from the bins is by use of an auger 20 which is powered by a motor 16. One of the motors 16 and a portion of the corresponding bin 12 is broken away in FIG. 1 to view the auger 20. A drive belt 18 would transfer rotation from the motor 16 to the auger 20 which would rotate to transfer a desired amount of micro-ingredient from the bin 12, through discharge tube 22, and into the weigh hopper 24. The speed and duration for operation of the auger 20 would be controlled as by a control unit 25 which would be programmed for operating the auger 20 as further discussed below.

FIG. 1 illustrates a pair of storage bins 12 which dispense their micro-ingredients into a weigh hopper 24, which then in turns drops its contents into a single product collection tank 30. However, in addition to a pair of storage bins 12 dispensing into one product collection tank 30, it is contemplated that a single product collection tank 30 may also receive micro-ingredients from a single storage bin, or from more than two storage bins. For example, four, six or eight storage bins may provide micro-ingredient products into a single product collection tank 30. It is also contemplated within this embodiment to provide a plurality of weigh hoppers (not shown) for a plurality of storage bins depending upon the types and quantities of micro-ingredients which are required to be routinely delivered to a feed ration. For the configuration shown in FIG. 1, micro-ingredients may be dispensed either simultaneously or sequentially into the weigh hopper, again depending upon the micro-ingredients to be delivered. The weigh hopper 24 provides an indication of the weight of the micro-ingredients which have been added thereto, and the weigh hopper also electrically communicates with control unit 25.

The control unit controls the operation of the augers 20 by comparing weighed amounts of the dispensed micro-ingredients to desired amounts, and then operating the augers with the correct speed and duration to satisfy a particular needed quantity of the micro-ingredients. Once the desired amount of one or more micro-ingredients are delivered to the weigh hopper 24 and the weight(s) have been confirmed by the scales 26 of the weigh hopper, the micro-ingredient(s) may be released from the weigh hopper as by discharge valve 28 which allows the micro-ingredient(s) to fall directly into the product collection tank 30. The micro-ingredient(s) would then remain within the product collection tank until such time the micro-ingredients were to be delivered to the feed ration by cycling the pumping system interconnected to the product collection tank 30, as discussed below.

At least one, and more preferably two, conveyance pumps 32 are connected in series to the outlet 42 of the product collection tank 30. The conveyance pumps 32 are used in conjunction with transport piping 34 to convey the micro-ingredients from the product collection tank 30 to the desired location, such as an animal feed mixer 40 which may contain a particular feed ration. The conveyance pumps 32 may be constant or variable speed pumps with equal or different capacities. In one embodiment, the applicant has successfully used 1.5 horsepower centrifugal pumps.

The control unit 25 may be in the form of a programmable logic controller (PLC) which essentially operates as a computer with software which can be programmed to control each of the components or elements in the system. As well understood by those skilled in the art, the PLC is capable of operating a wide array of output devices such as the motor(s) 16, conveyance pumps 32 and flush ring pump 36 that is used to supply a conveyance or carrier fluid such as water to the product collection tank 30. In addition, the PLC is capable of receiving numerous inputs which monitor the system, such as scale(s) 26. Various electrical control lines 44 illustrate that each of the components are either controlled by control unit 25 or provide input to the control unit 25.

A carrier fluid or water source 48 is shown with one or more liquid lines 50 which connect to the flush ring 38, thereby providing the desired flow of water to the product collection tank 30 during cycling of the conveyance pump 32. As used herein, the term "water" is interchangeable with "carrier fluid," which typically comprises potable water.

Figure 16:
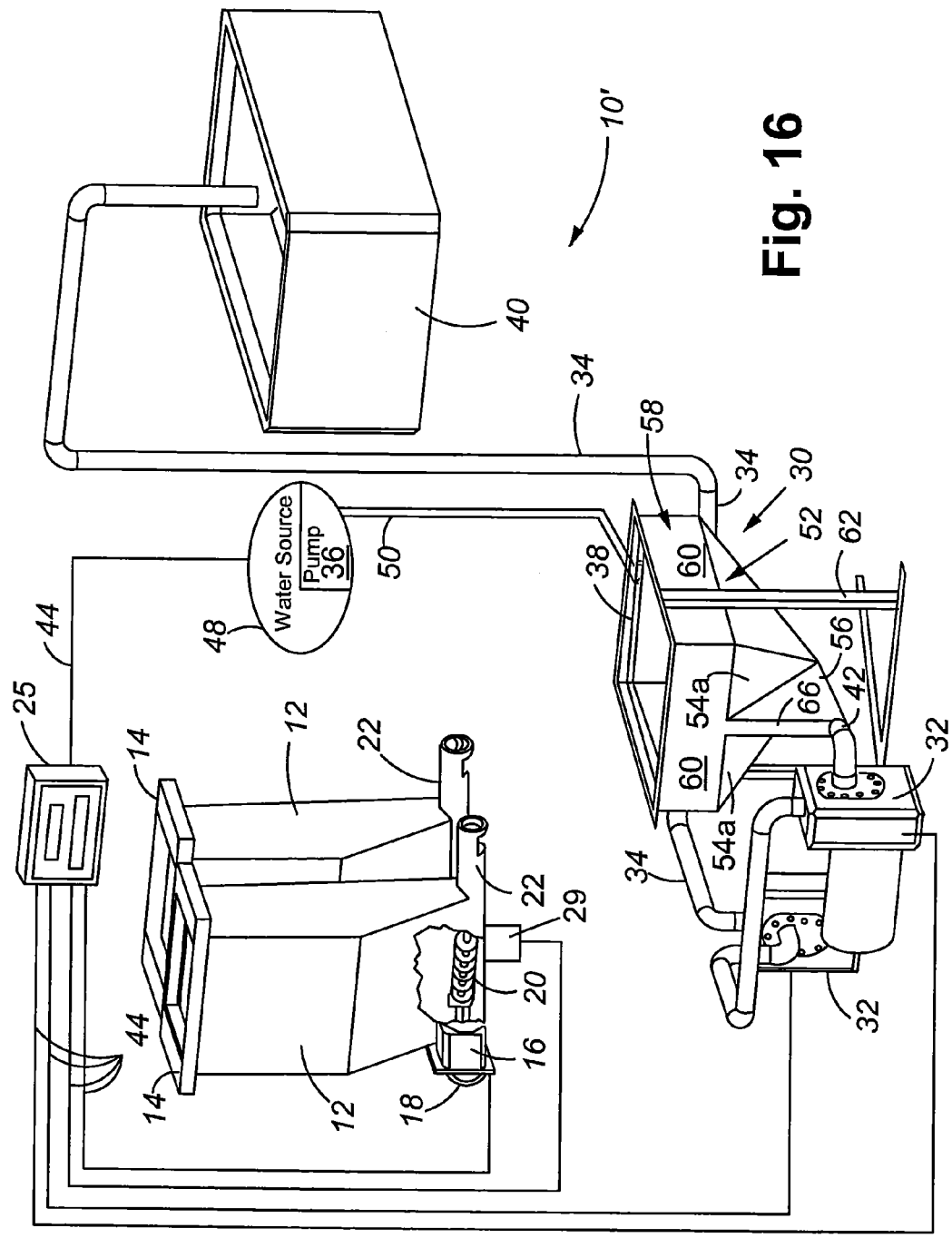
FIG. 16 is a schematic view comprising another preferred embodiment of the present invention.

The weigh hoppers and scales may be eliminated in favor of a different means by which to measure the dispensing of micro-ingredients. For example, as shown in FIG. 16 one additional way in which the micro-ingredients may be weighed is by load cells 29 which may be positioned under the storage bins 12 and mounted on platforms (not shown). The load cells 29 would provide weight measurement by a signal sent to the control unit 25. With the use of load cells 29, the measured amounts of micro-ingredients would be calculated by loss in weight of the storage bins 12 as the micro-ingredients are dispensed.

Figure 17:
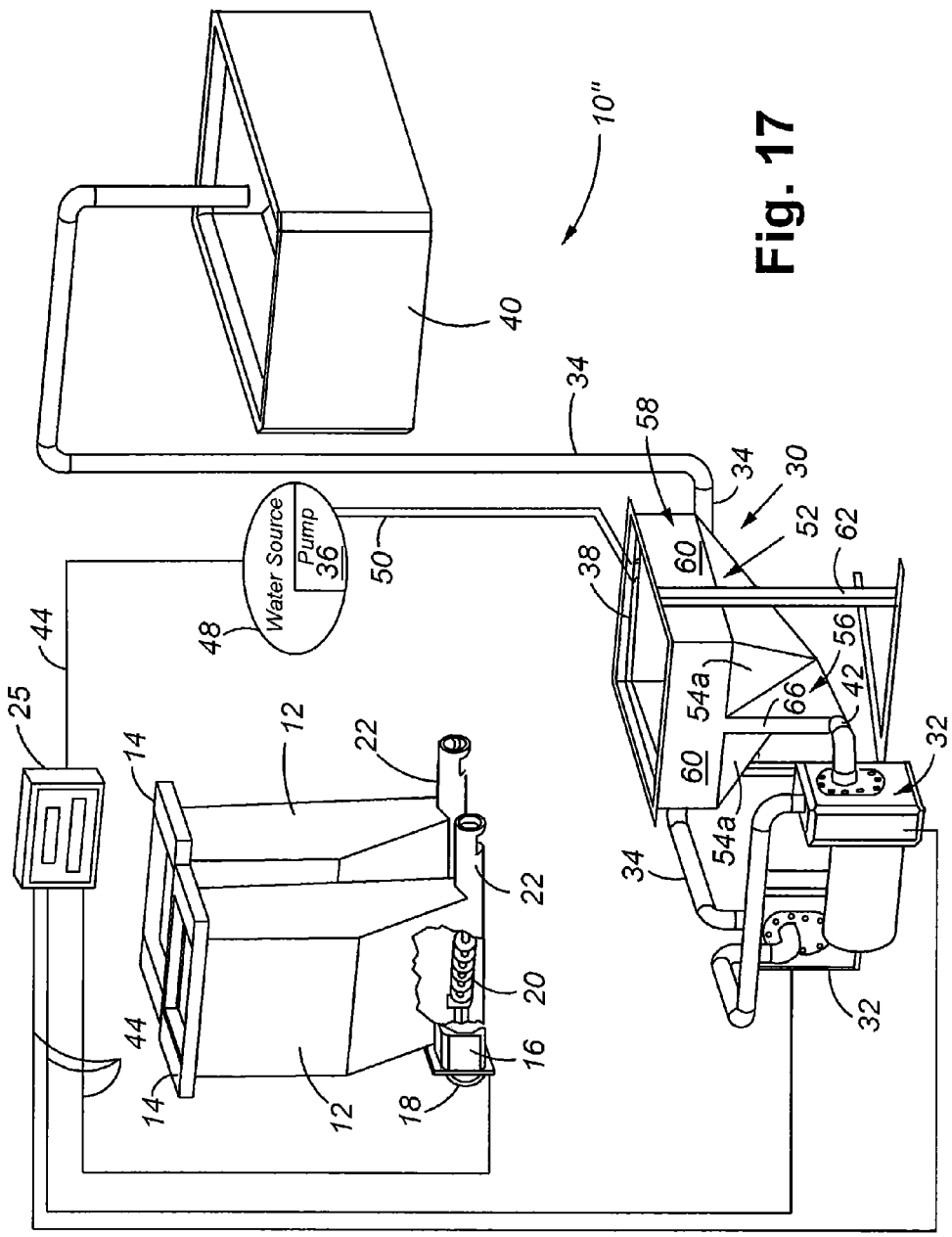
FIG. 17 is a schematic view comprising a yet another preferred embodiment of the present invention.

Referring now to FIG. 17, in lieu of measuring the dispensed amount of micro-ingredients as by load cells, each auger 20 could be precisely calibrated to dispense the desired quantity of micro-ingredients. According to this method, a calibration would take place for each of the augers 20 to ensure that operating the augers 20 at a particular speed and duration corresponded to dispensing of a known amount of a micro-ingredient. Volumetric metering of micro-ingredients in this fashion is suitable for those micro-ingredients which are delivered in greater quantities, as it is much more difficult to accurately meter smaller quantities of micro-ingredients. For both the loss in weight and volumetric metering methods, the micro-ingredients can be dispensed directly into the product collection tank 30. Thus, there is no need for any type of hopper or other intermediate structure thereby further simplifying the system.

Referring now to FIGS. 1-4, a first embodiment of a product collection tank 30 used in system 10 is shown. The product collection tank 30 comprises a funnel-like portion 52 that defines a progressively decreasing cross section downward. For the embodiments shown and described herein, the funnel-like portion 52 is a frustro-pyramidal configuration; however, this is exemplary and not meant to limit the present description. Thus, it should be understood that the term "funnel-like portion" includes shapes other than frustro-pyramidal, including pyramidal shapes, as well as conical and frustro-conical shapes, etc. The upper portion of the product collection tank 30 preferably includes an extension portion 58 that provides additional capacity or volume to the product collection tank 30. For the embodiments shown herein, in plan view the extension portion 58 has substantially vertical sidewalls 60. The geometric cross-sectional shape will typically vary to match that of the funnel-like portion. Thus, extension portion 58 may have a substantially square or rectangular shape, as shown in the Figures, or may have a circular or other shape. In one embodiment, the funnel-like portion 52 has a height H of about 8.5 inches, a length L of about 20 inches, and a width W of about 15 inches; however, other dimensions are within the scope of the invention. The product collection tank 30 may further include a mounting structure, such as framing 62, which construction will be known to those skilled in the art.

Figure 3:
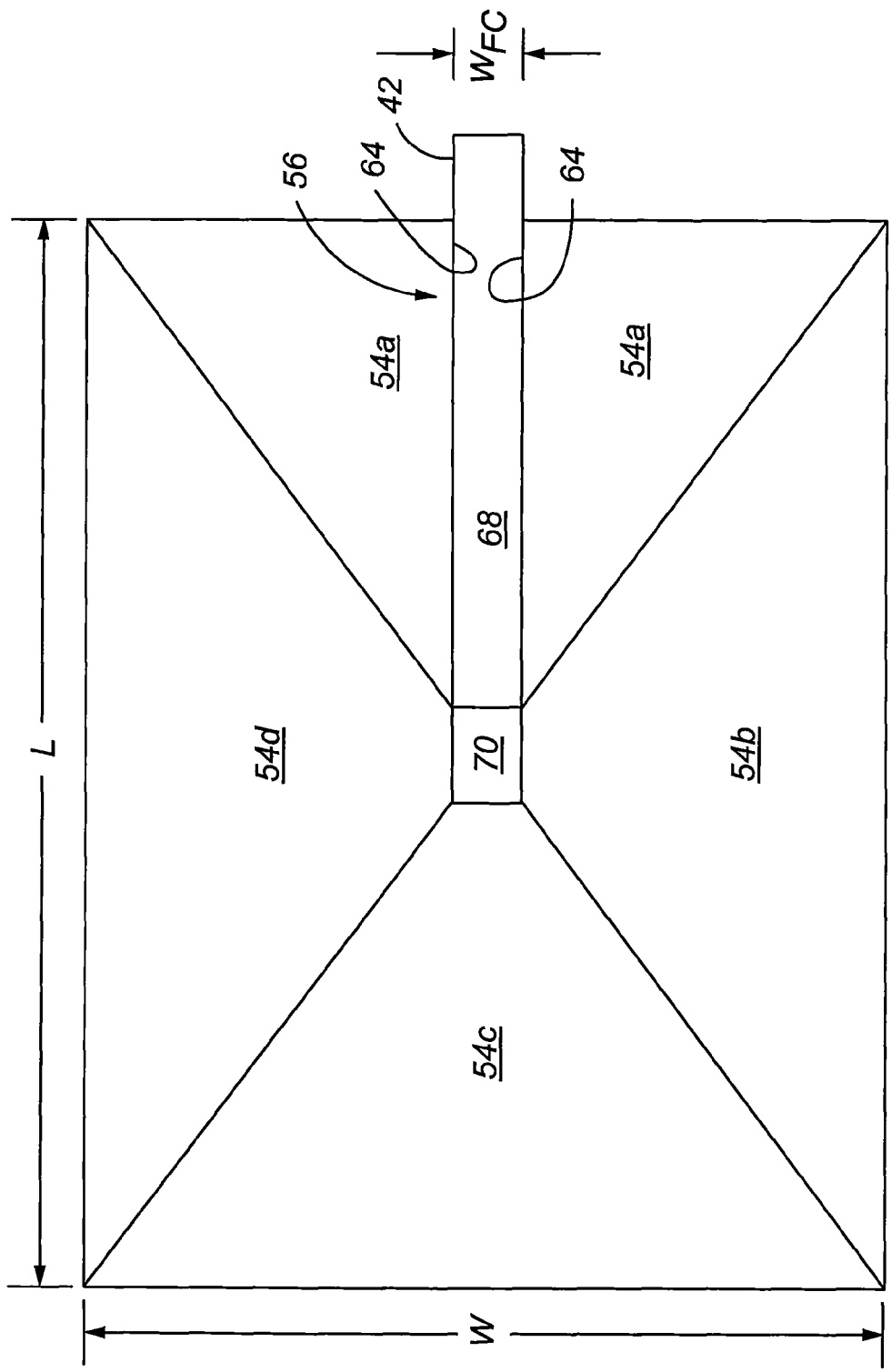
FIG. 3 is a plan view of the device shown in FIG. 2.
Figure 4:
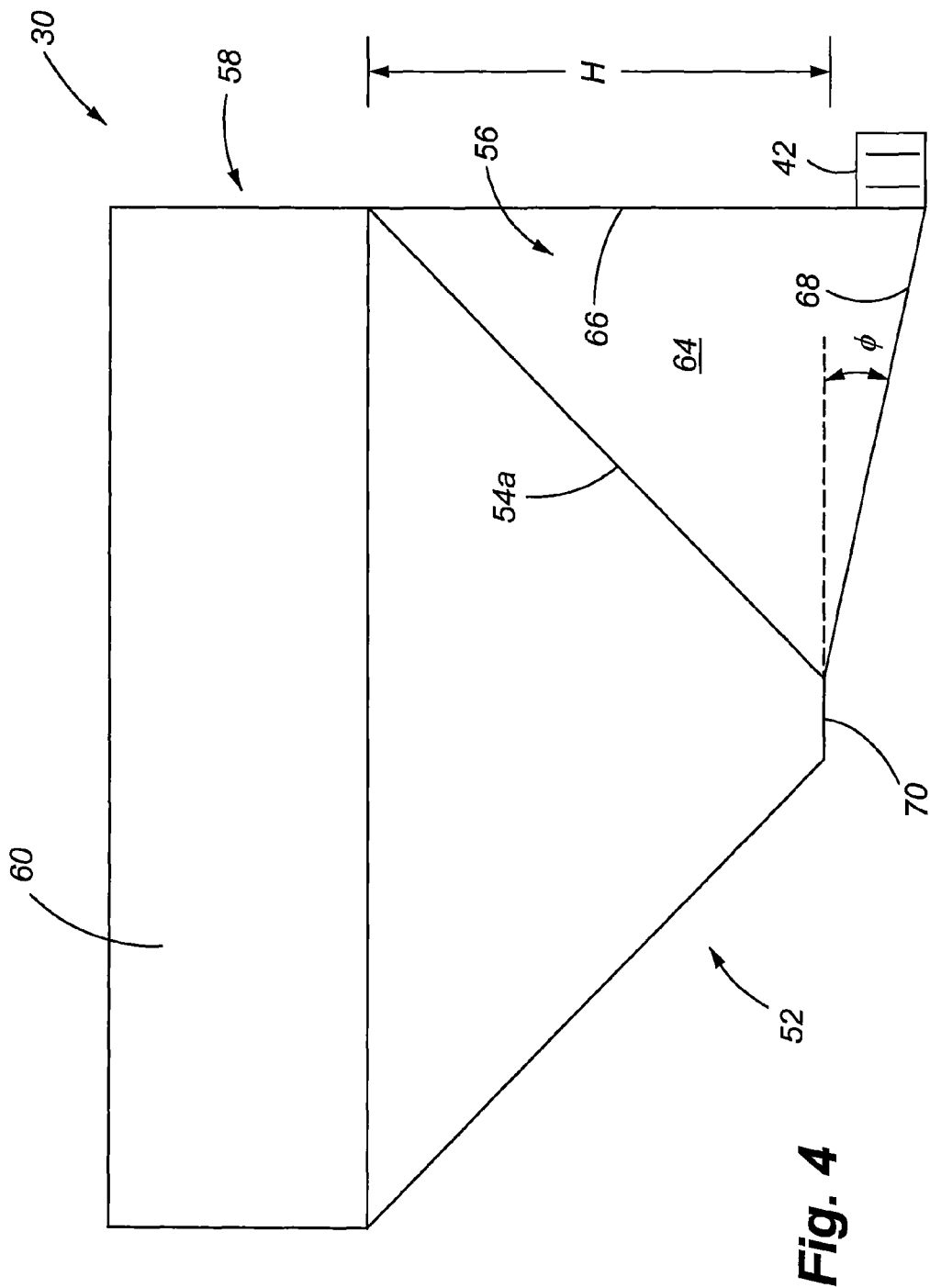
FIG. 4 is a side elevation view of the device shown in FIG. 2.

As best seen in FIG. 3, the frustro-pyramidal shaped funnel-like portion 52 includes sloping surfaces 54a-54d, where sloping surface 54a further includes a flush chamber 56. The flush chamber 56 leads to outlet 42. As best seen in FIG. 4, the flush chamber 56 includes substantially vertical sidewalls 64 that are triangular in shape. In addition, the flush chamber 56 includes a substantially vertical endwall 66. For the configuration shown in FIGS. 1-4, the endwall 66 is substantially co-planar with the vertical sidewall 60 located above the endwall 66. For one embodiment, the flush chamber width $W_{FC}$ is about 1.5 inches, where the product collection tank has a length L of 20 inches and a width W of 15 inches; thus, the flush chamber occupies about 10% of the width.

Referring now to FIG. 4, a side elevation view of the product collection tank 30 is shown. For the embodiment shown in FIGS. 1-4, the flush chamber 56 is a 3-dimensional notched region in the sloping surface 54a of the funnel-like portion 52. For the embodiment depicted in FIGS. 1-4, the flush chamber 56 has a flush chamber bottom surface 68 that is both planar and sloping. More particularly, the flush chamber bottom surface 68 slopes from the center or truncated portion 70 of the bottom of the funnel-like portion 52 toward the side-positioned outlet 42. The flush chamber bottom surface 68 slopes downward toward the outlet 42 at a bottom angle φ of between about 0.1 to 45 degrees, and more preferably at an angle of between about 1 to 10 degrees, and more preferably yet, at an angle of about 8 degrees. This preferred angle allows the carrier fluid or water to flush the product from the tank.

Figure 5:
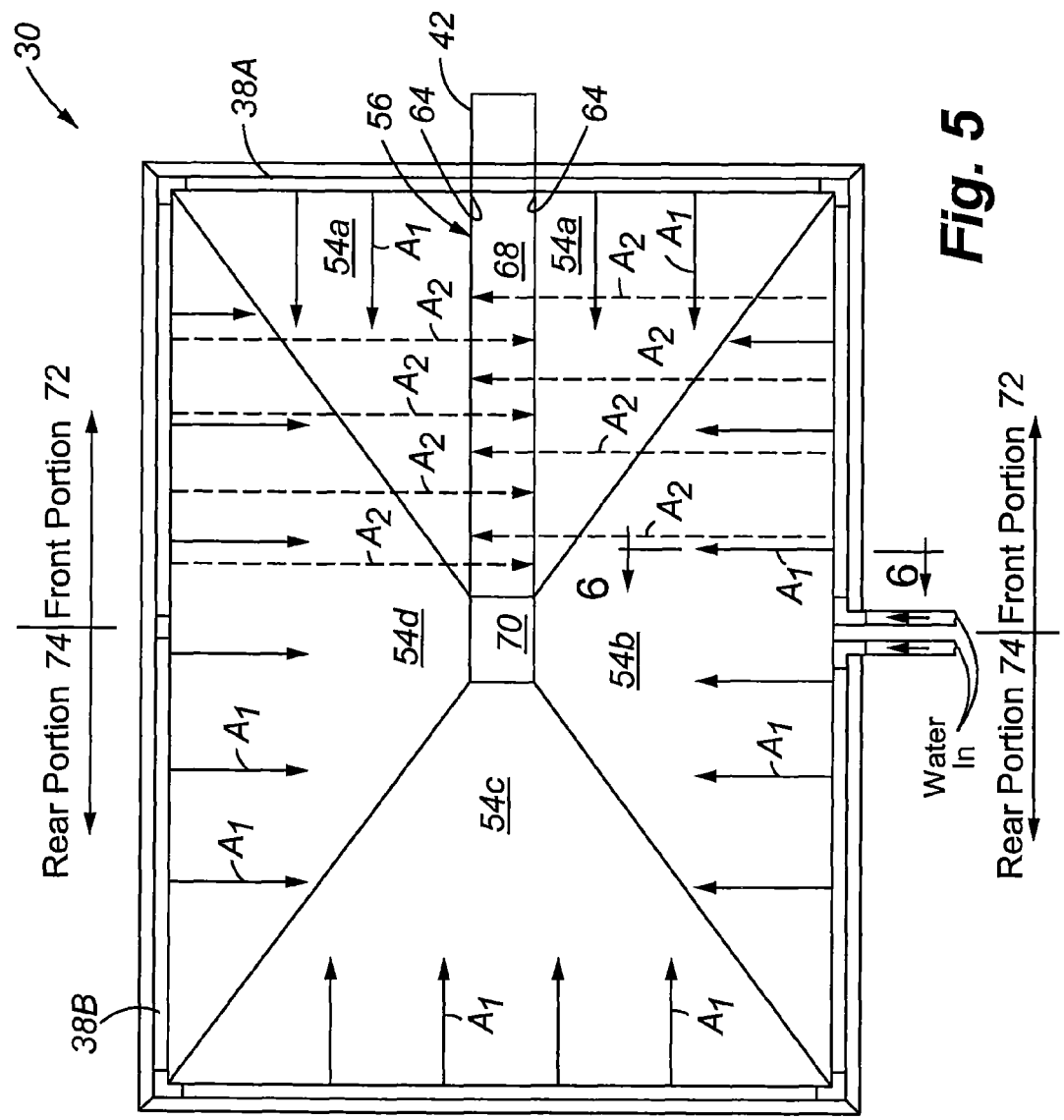
FIG. 5 is a plan view of the device shown in FIG. 3 with a flush ring.
Figure 6:
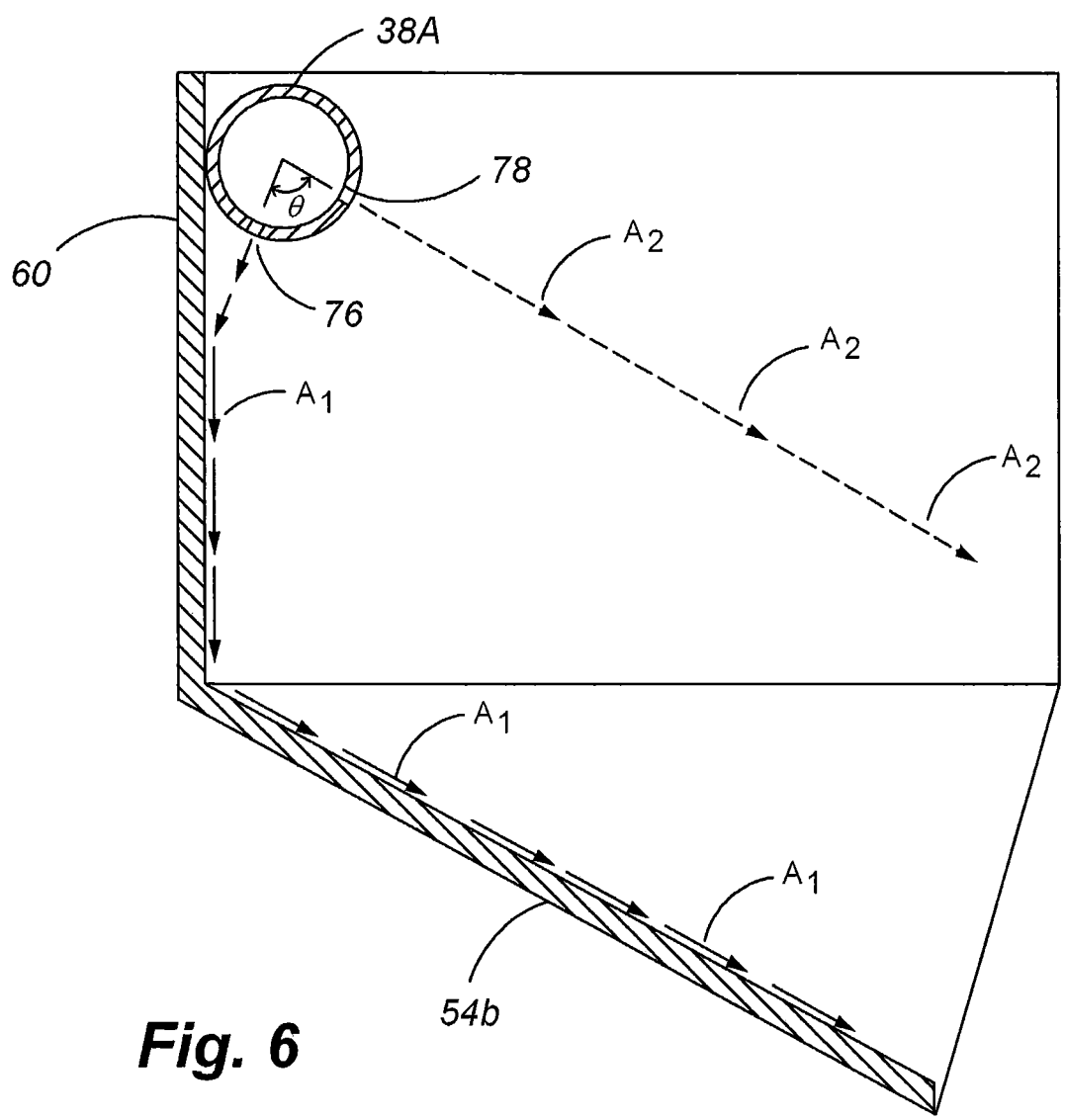
FIG. 6 is a detail cross-sectional view of a portion of the flush ring shown in FIG. 5 taken along line 6-6 of FIG. 5.

Referring now to FIGS. 5 and 6, in a separate aspect of the invention, a flush ring 38 is connected to the product collection tank 30. The flush ring 38 preferably provides uneven flow distribution. More particularly, greater flow is preferably provided to a rear portion of the product collection tank 30. In addition, supplemental water is sprayed onto the sidewalls 64 of the flush chamber 56. In general, the flush ring 38 serves to provide the carrier fluid or flush water to the product collection tank 30. The water injected into the product collection tank 30 from the flush ring 38 serves to wash product material from the interior surfaces of the product collection tank 30, and, in combination with the conveyance pumps 32, serves to convey, transfer or propel the product from the product collection tank 30 when the water reaches the outlet 42.

Referring to FIG. 5, the flush ring 38 may take several forms; however, a perforated PVC pipe or other metal or plastic piping is suitable, provided the material type is checked for compatibility with products flushed though the product collection tank 30. As noted, the flush ring 38 preferably provides uneven flows to the product collection tank 30. For purposes of discussion, the product collection tank 30 can be divided into two lateral portions: (1) a front portion 72 that is defined herein as the side of the product collection tank 30 with the flush chamber 56 and the outlet 42; and (2) a rear portion 74 that is defined herein as the side of the product collection tank 30 opposite the flush chamber 56 and the outlet 42. The flush ring 38 may be continuous (not shown) and extend around the entire interior perimeter of the product collection tank 30, or the flush ring 38 may be discontinuous as shown in FIG. 5, wherein the flush ring 38 is divided into a flush ring front portion 38A and a flush ring rear portion 38B. Preferably, more water is provided to the rear portion 74 than the front portion 72 of the product collection tank 30. One means for providing the uneven flows is to increase the size of the perforations in the area to receive more flow. More particularly, the flush ring front portion 38A can provide water to the front portion 72 of the product collection tank 30 using perforations that are approximately one-half the diameter of the perforations within the flush ring rear portion 38B, which provides water to the rear portion 74 of the product collection tank 30. Thus, for constant input flows being provided to both the flush ring front portion 38A and flush ring rear portion 38B, more flow is being provided to the rear portion 74 of the product collection tank 30 than is being provided to the front portion 72 of the product collection tank 30. The uneven distribution of water assists in washing the product from the rear portion 74 of the product collection tank 30 toward the flush chamber 56 and outlet 42 located on the front portion 72 of the product collection tank 30.

Referring now to FIG. 6, a cross section through part of the flush ring front portion 38A is shown. FIG. 6 illustrates a first perforation 76 that provides flow directed to the sidewalls 60 of the extension portion 58. Arrows A1 depict the typical flow direction of the water passing though first perforations 76. Arrows A1 show that the water initially strikes and flows down along the interior surface of the sidewalls 60 of the extension portion 58, and then the water flows down the interior surface of the sloping faces of the funnel-like portion 52 of the product collection tank 30. As noted above, the first perforations 76 of front flush ring portion 38A are one-half the diameter (that is, ¼ the opening area) of the first perforations located on the rear flush ring portion 38B.

Still referring to FIG. 6, the cross section view of first flush ring 38A also depicts second perforations 78 that direct water streams toward the interior of sidewalls 64 of the flush chamber 56. Preferably, the first flush ring 38A includes at least one second perforation 78, and more preferably, the first flush ring 38A includes about 4 to 12 second perforations 78, and more preferably yet, the first flush ring 38A includes about 8 second perforations 78, where about 4 perforations 78 are directed toward each of the two sidewalls 64 of the flush chamber 56.

Arrows A2 depict the typical flow direction of the water passing though second perforations 78. Preferably, the first perforations are separated from the second perforations 78 by a perforation angle θ, where θ is sufficient in size to direct the streams of water toward the target surfaces. In one embodiment, θ is about 90 degrees. In one embodiment, the rear flush ring portion 38B does not have second perforations 78; however, supplemental perforations in the rear flush ring portion 38B providing projecting streams toward the flush chamber 56 are contemplated. The flush ring 38 is preferably attached to the product collection tank 30 using hardware (not shown).

Although not shown, a plurality of flush rings could be provided, with a first flush ring providing sidewall rinse water and a second flush ring with separate perforations solely directed toward the flush chamber 56. In addition, nozzles (not shown) could be used in conjunction with the flush ring(s). Thus a variety of flush rings and related components are contemplated and encompassed by the scope of the present invention.

Figure 7:
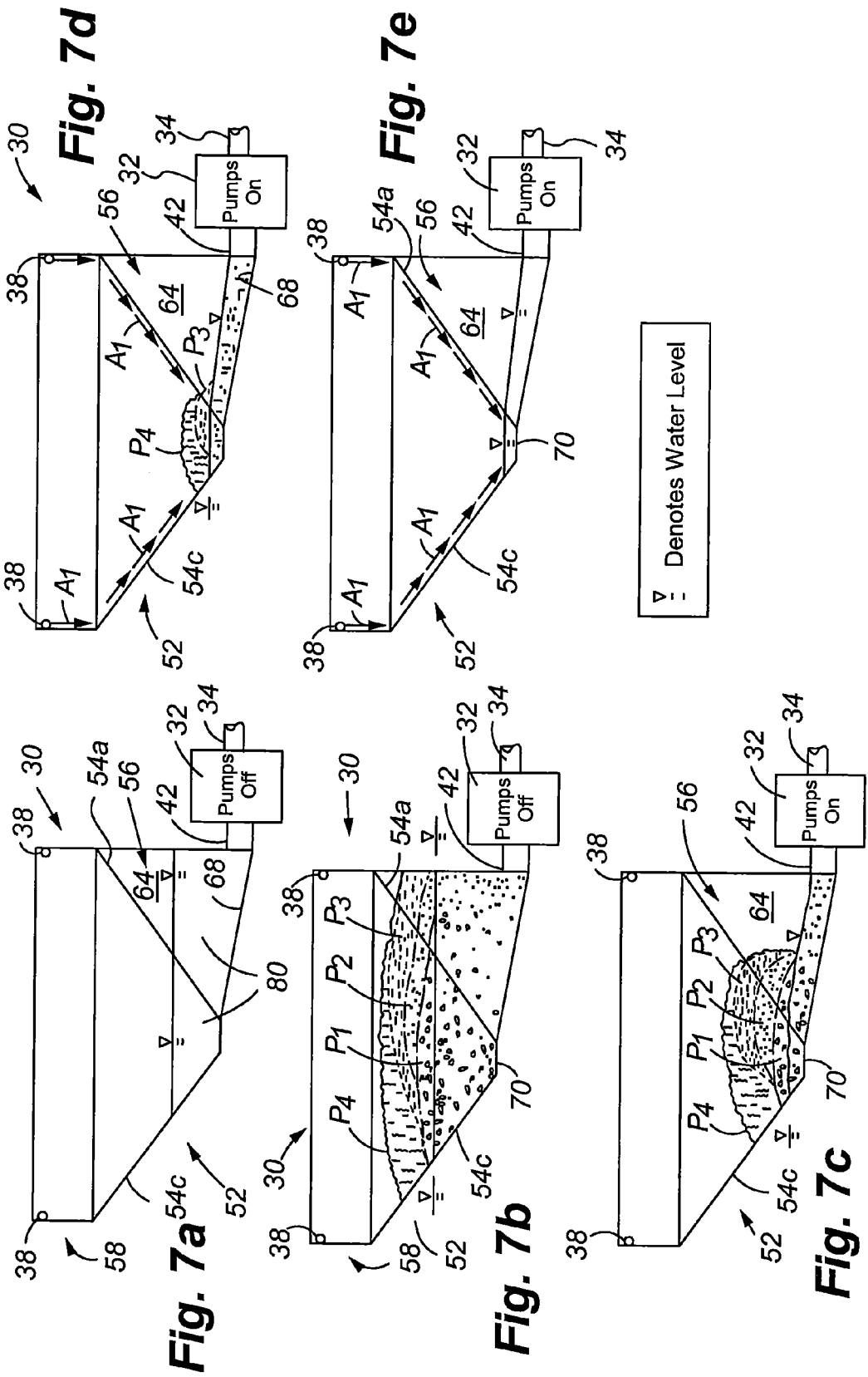
FIGS. 7A-7E are side elevation views of the device shown in FIG. 2 during various intervals of an example cycle.

Referring now to FIGS. 7A-7E, a series of drawings are provided for illustrating the product collection tank 30 in use. Referring to FIG. 7A, before receiving product from the weigh hopper 24, the product collection tank 30 contains a quantity of backfill water 80. This is the water that remains in the product collection tank 30 after the system 10 has cycled. The product collection tank 30, therefore, has backfill water 80 both within the bottom of the funnel-like portion 52 and the flush chamber 56.

Referring now to FIG. 7B, the product collection tank 30 is shown with product, such as one or more micro-ingredients added to the backfill water 80. For the present example, four different product layers are shown. Thus, the current example would involve a first bin 12 proving a first product P1 to the weigh hopper 24, which in turn dumps the first product P1 into the product collection tank 30. Depending upon the characteristics and the consistency of the first product P1, some of it may float and some may sink within the backfill water 80. Subsequent to the first product P1 being dumped into the product collection tank 30, a second bin 12 provides second product P2 to the weigh hopper 24, which in turn dumps the second product P2 into the product collection tank 30. Since the bins are typically aligned along the length of the weigh hopper 24, and therefore, along the length of the product collection tank 30, the layers of product are typically observed to be stratified, but not uniform. For a total of four products, the third and fourth bins are adding the third product P3 and fourth product P4, respectively to the product collection tank 30. Thus, as shown in FIG. 7B, the layers of products P1-P4 are typically stratified and uneven, and somewhat submerged, but also floating in the backfill water 80. Since some of the products P1-P4 are submerged in the backfill water 80, the water level in the product collection tank 30 is typically higher after the addition of product than before adding the product.

Referring now to FIG. 7C, in one method of use, the conveyance pumps 32 are turned on before adding water to the product collection tank 30 through the flush ring 38. Thus, the conveyance pump 32 initially draws-down the backfill water 80 from the product collection tank 30, together with a quantity of the product P1-P4. Since the product P1-P4 is stratified, the first product P1 tends to be flushed from the product collection tank 30 first. However, the distribution of product that is flushed from the product collection tank 30 also depends on where it was dropped into the product collection tank 30 from the weigh hopper 24. Product within the flush chamber 56 which leads to the outlet 42 is also flushed during the initial draw-down.

Referring now to FIG. 7D, after a few seconds, the flush ring pump 36 is activated by the control unit 25 to provide water to the product collection tank 30 through the flush ring 38. Note that a flush ring pump may not be necessary if a water storage tank with sufficient head and a controllable valve is instead interconnected to the flush ring 38 and the control unit 25. Further note that while FIGS. 7A-7E illustrate the example of the water entering the product collection tank 30 from the flush ring after the conveyance pumps have started, the present invention also encompasses activating the flush ring before or simultaneous to activating the conveyance pumps. The water from the flush ring tends to wash product down the sloping surfaces 54a-54d of the funnel-like portion 52. The flush ring water carries product into the flush chamber 56, which is then conveyed out the outlet 42 and conveyed to the feed mixer 40. As shown in FIG. 7D, the last layers of product P3 and P4 added to the product collection tank 30 tend to be the last product in the product collection tank 30 during the cycling to flush the product from the product collection tank 30. The sloping surfaces 54a-54d of the funnel-like portion 52 also tend to hold the product back and away from the outlet 42. Thus, the flush ring water gradually moves product into the flush chamber 56 from the central area of the funnel-like portion 52 of the product collection tank 30.

Referring now to FIG. 7E, the flush ring 38 continues to add water and the conveyance pumps 32 continue to pump the flush water and the product from the product collection tank 30 until all of the product P1-P4 is removed from the product collection tank 30. For the present invention, a normal pump cycle period typically spans 40 to 60 seconds, but may be shorter or longer depending upon the amount of fluid or water desired to pass through to the feed mixer 40. In addition, the cycle period is can be adjusted to properly flush the amount of product within the product collection tank 30 that needs to be conveyed to the feed mixer 40. The cycle time can be adjusted by the operator of the apparatus using the control unit 25. During the pump cycle, approximately 2 pounds per second of water is being conveyed from the product collection tank 30 and is carrying the product with it.

In summary, the product collection tank 30 typically initially contains some amount of backfill water 80 (although the tank could cycle even without the presence of backfill water because the flush ring would eventually add sufficient water to prime the pumps). After dry micro-ingredient(s) have been weighed and transferred into the product collection tank 30, the pumps 32 are activated. Once the conveyance pumps 32 are activated, water is then added by way of the flush ring 38, which rinses the product down to the flush chamber 56, which is then conveyed out the outlet 42. The configuration of the flush chamber 56 controls the gradual process of flushing product though the outlet, while at the same time not allowing a large quantity of product to suddenly clog the outlet. In addition, if the water source providing water to the flush ring 38 is turned off or is otherwise interrupted, the product tends to stay within the central area of the funnel-like portion 52, and the somewhat moist ball or mass of product is not sucked into the transport piping 34 and/or one or more of the conveyance pumps 32.

Instead, the product simply sits in the center of the funnel-like portion away from the outlet 32. The conveyance pumps 32 may run during this occurrence, but a large and troublesome mass of moist and packable product is not in the direct vicinity of the outlet to get sucked into the transport piping 34 and/or conveyance pumps 32. Thereafter, when water availability is returned to the system 10, water is added to the product collection tank 30 by the flush ring 30 and the pumps 32 flush the product out of the product collection tank 30. Therefore, the present invention reduces the amount of down time for the system, and also reduces the amount of servicing time necessary to remove clogs from the transport piping 34 and/or conveyance pumps 32.

Figure 8:
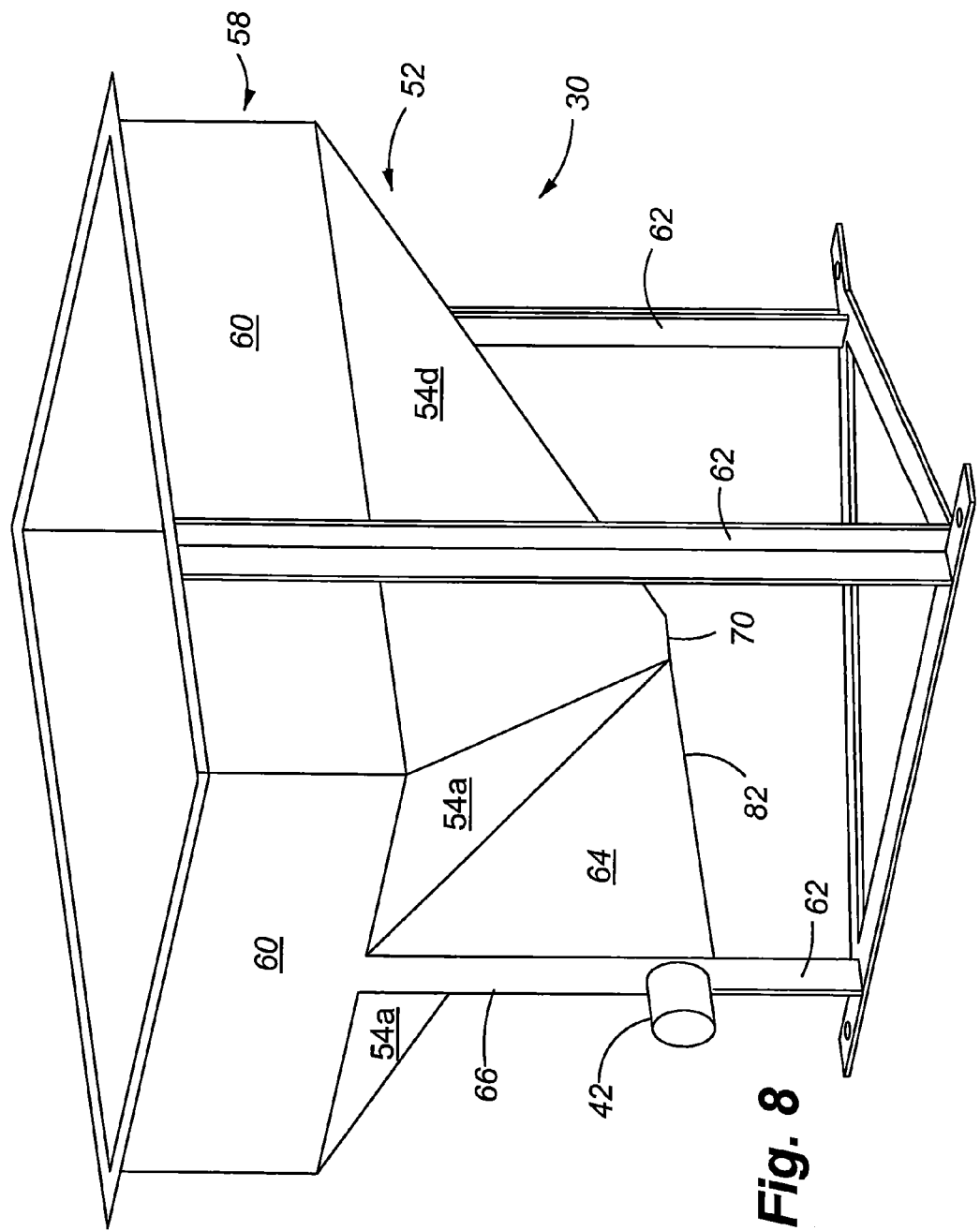
FIG. 8 is a perspective view a modification of the device shown in FIG. 2.
Figure 9:
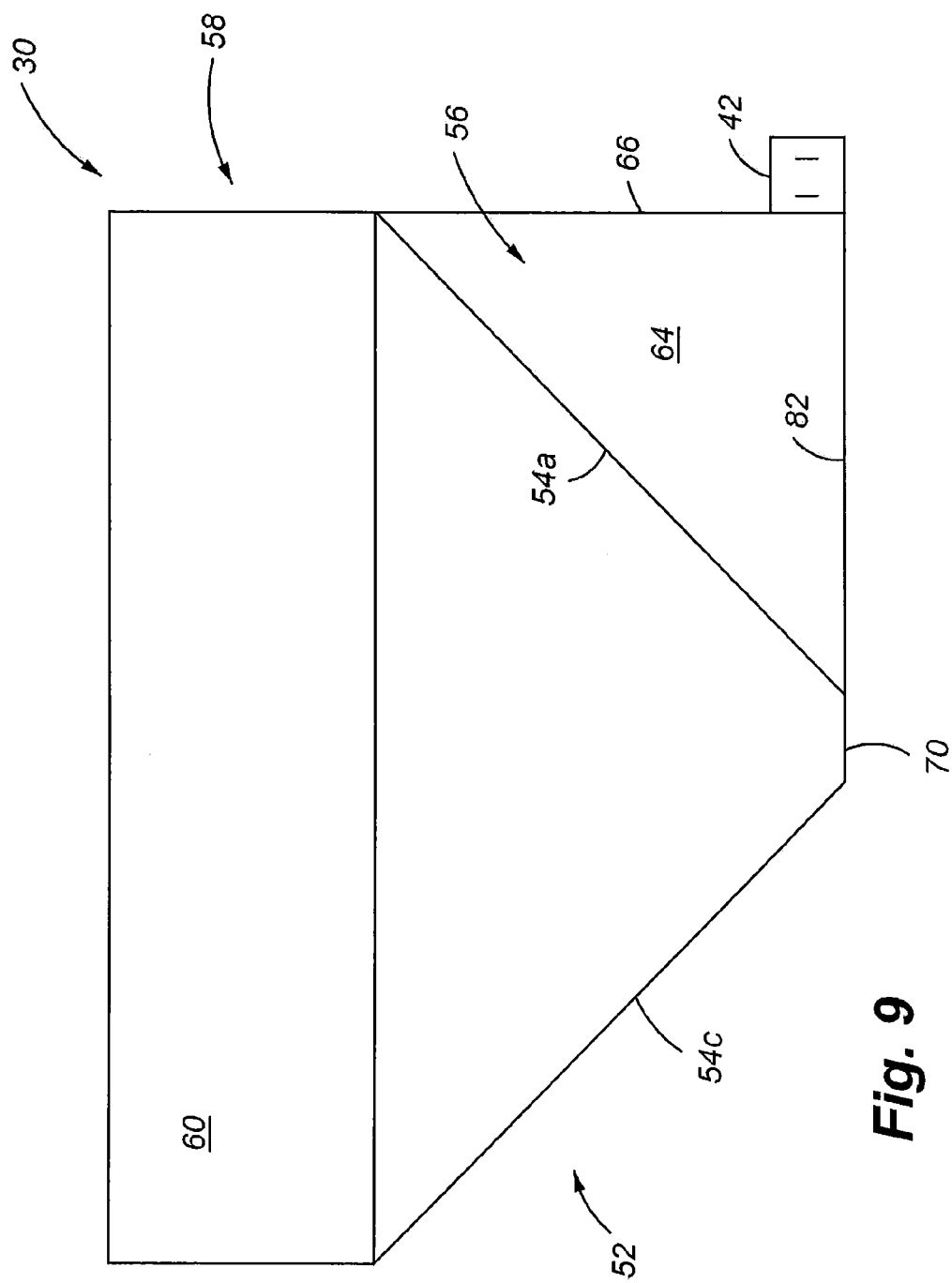
FIG. 9 is a side elevation view of the device shown in FIG. 8.

Referring now to FIGS. 8 and 9, in a modification to the current embodiment, perspective and side elevation views of a product collection tank 30 is shown, wherein the flush chamber 56 has a substantially flat flush chamber bottom surface 82. More particularly, the substantially flat flush chamber bottom surface 82 is substantially the same elevation as the elevation of the bottom of the funnel-like portion 52. For the frustro-pyramidal configuration of the funnel-like portion 52 shown in FIGS. 8 and 9, the bottom truncated portion 70 is substantially the same elevation as the substantially flat flush chamber bottom surface 82. Furthermore, the bottom elevation of the outlet 42 is also substantially the same elevation as the entire length of the substantially planar and substantially flat flush chamber bottom surface 82.

Figure 10:
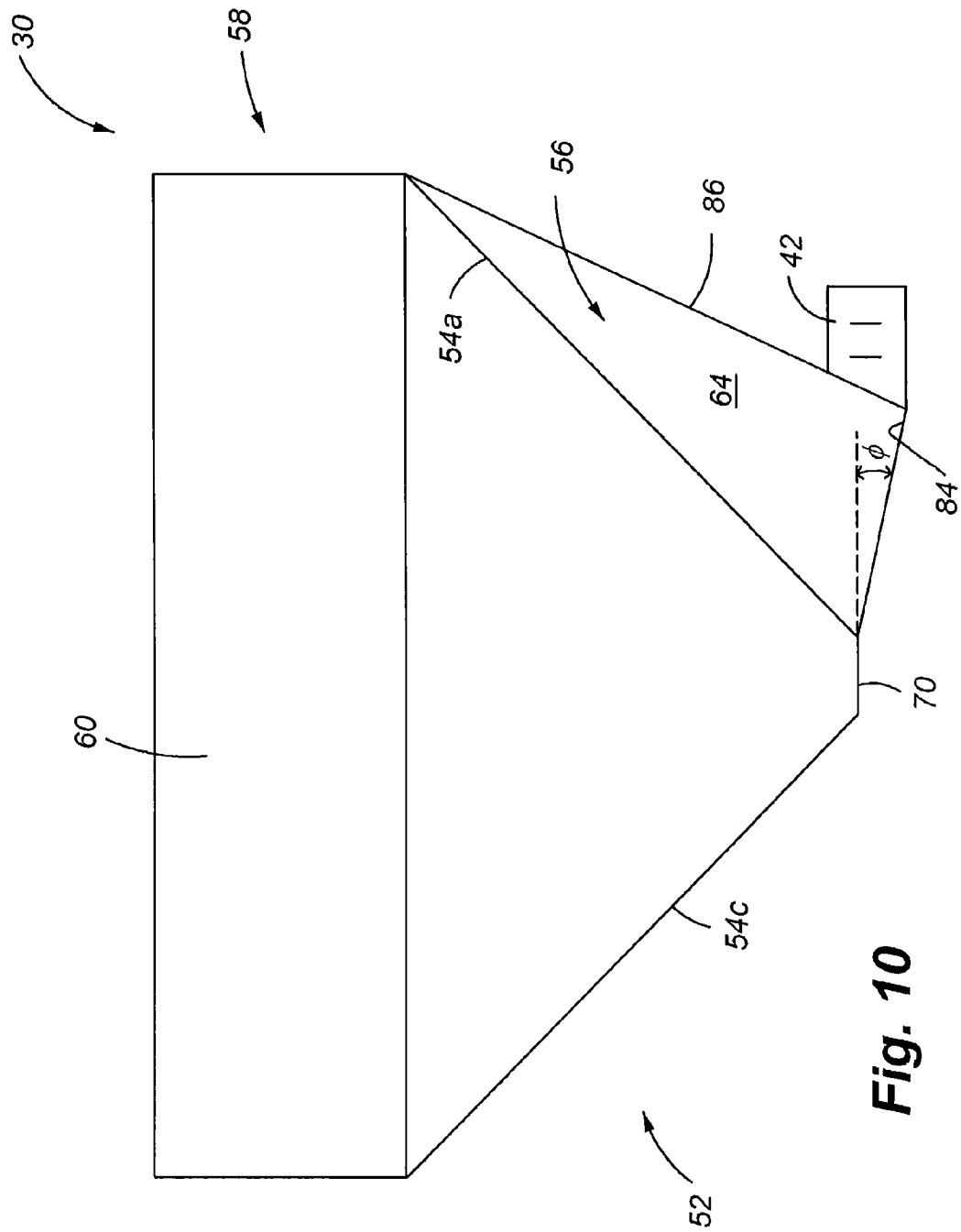
FIGS. 10-14 are side elevation views of modifications of the device shown in FIG. 2.

Referring now to FIG. 10, in another modification to the current embodiment, a side elevation view of a product collection tank 30 is shown, wherein the flush chamber 56 has a shortened flush chamber bottom surface 84. More particularly, for the configuration of the flush chamber 56 shown in FIG. 10, the flush chamber bottom surface 84 is sloping and shorter than the flush chamber bottom surface 68 shown in FIG. 4. For the configuration shown in FIG. 10, the outward sloping endwall 86 is not substantially vertical, but rather, it slopes up and outward from the bottom of the outlet 42 toward the top of the funnel-like portion 52 until it intersects the bottom of the extension portion 58 of the product collection tank 30.

Figure 11:
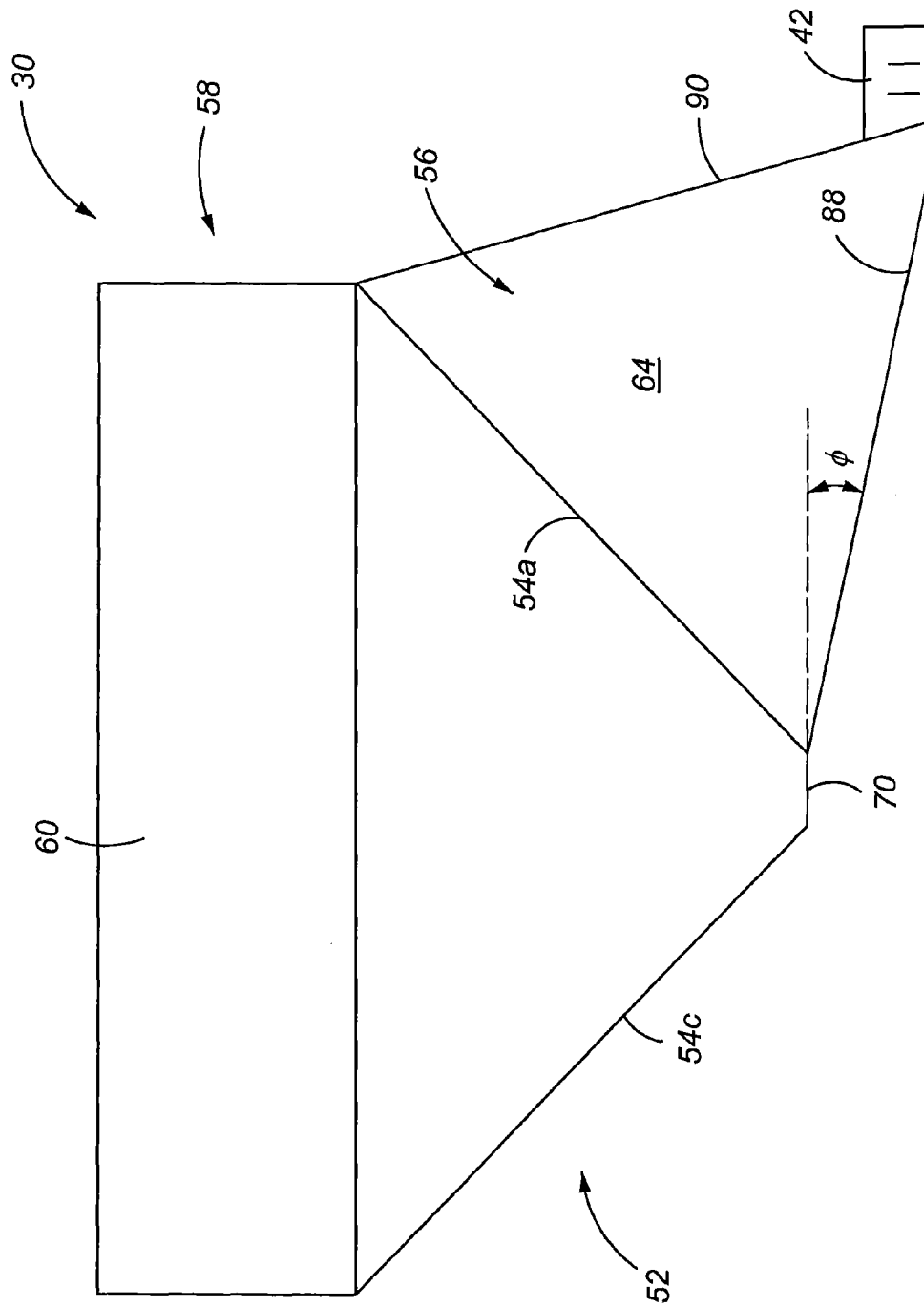

Referring now to FIG. 11, in still another modification to the current embodiment, a side elevation view of a product collection tank 30 is shown, wherein the flush chamber 56 has an extended flush chamber bottom surface 88. More particularly, for the configuration of the flush chamber 56 shown in FIG. 10, the extended flush chamber bottom surface 88 is sloping and longer than the flush chamber bottom surfaces 68 and 84 shown in FIG. 4 and FIG. 10, respectively. For the configuration shown in FIG. 11, the inward sloping endwall 90 is not substantially vertical, but rather, it slopes up and inward from the bottom of the outlet 42 toward the top of the funnel-like portion 52 until it intersects the bottom of the extension portion 58 of the product collection tank 30.

Figure 12:
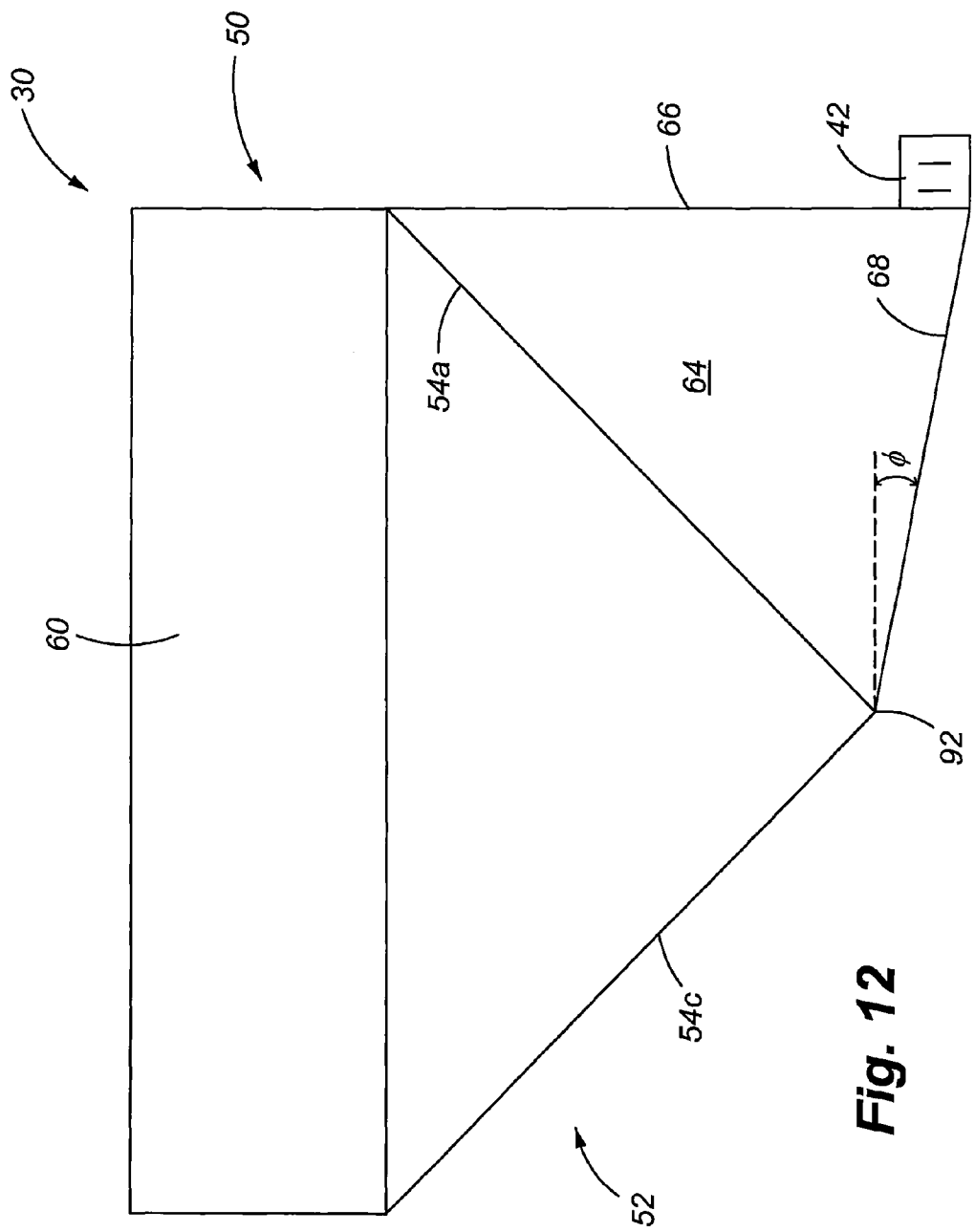

Referring now to FIG. 12, in yet another modification to the current embodiment, a side elevation view of a product collection tank 30 is shown, wherein the funnel-like portion 52 substantially comprises a pyramidal shape, such that there is not a flat surface to the bottom of the funnel-like portion 52. Instead, the product collection tank 30 has a substantially pointed bottom 92 with a sloping flush chamber bottom surface 68 that extends from the pointed bottom to the outlet 42.

Figure 13:
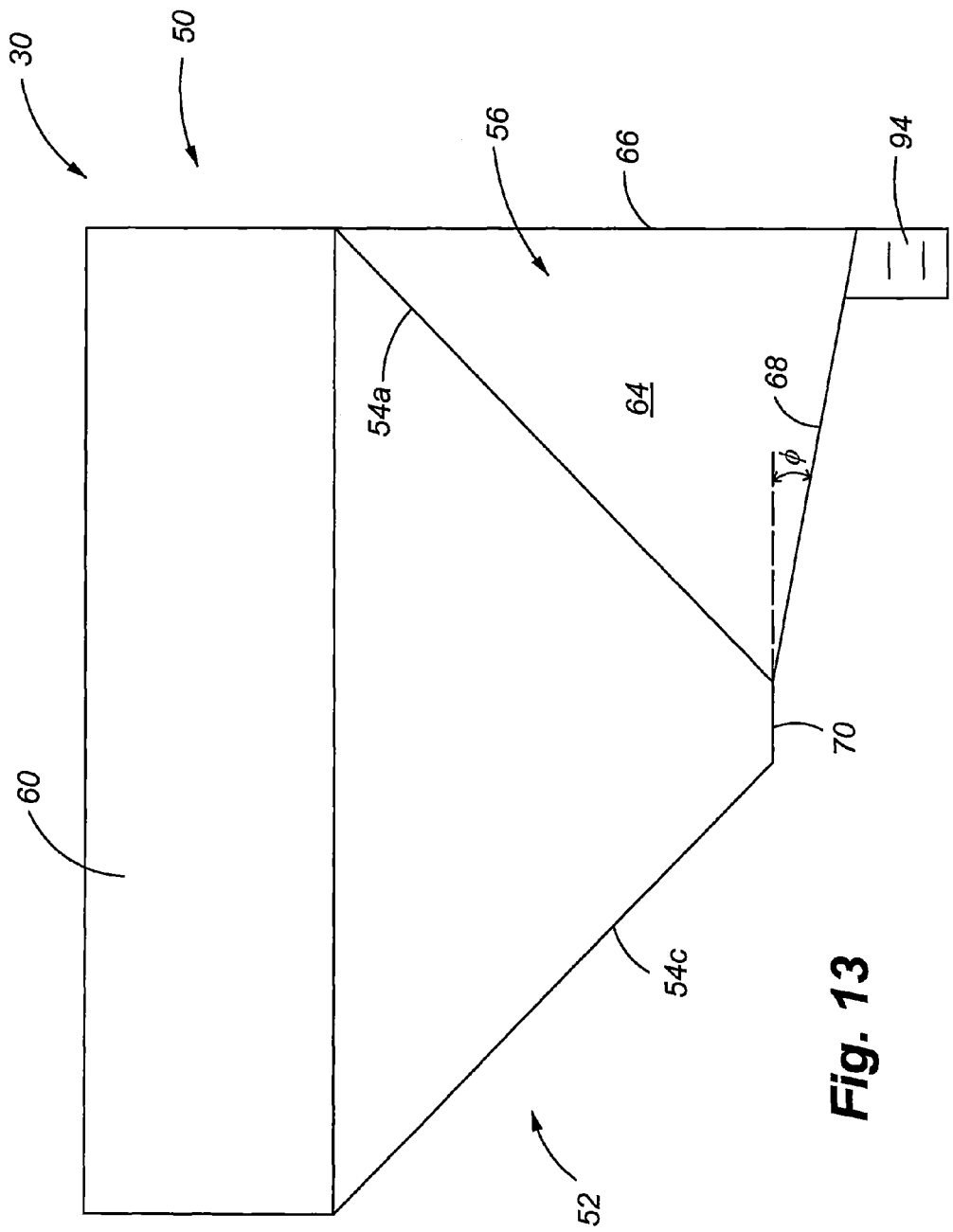

Referring now to FIG. 13, in still a further modification to the current embodiment, a side elevation view of a product collection tank 30 is shown, wherein the product collection tank 30 outlet is a substantially vertical outlet 94. It is to be understood that the outlet may be situated at variety of angles relative to and including horizontal. For example, the outlet may be positioned at an angle of 45 from down from horizontal. Such modifications are within the scope of the present invention.

Figure 14:
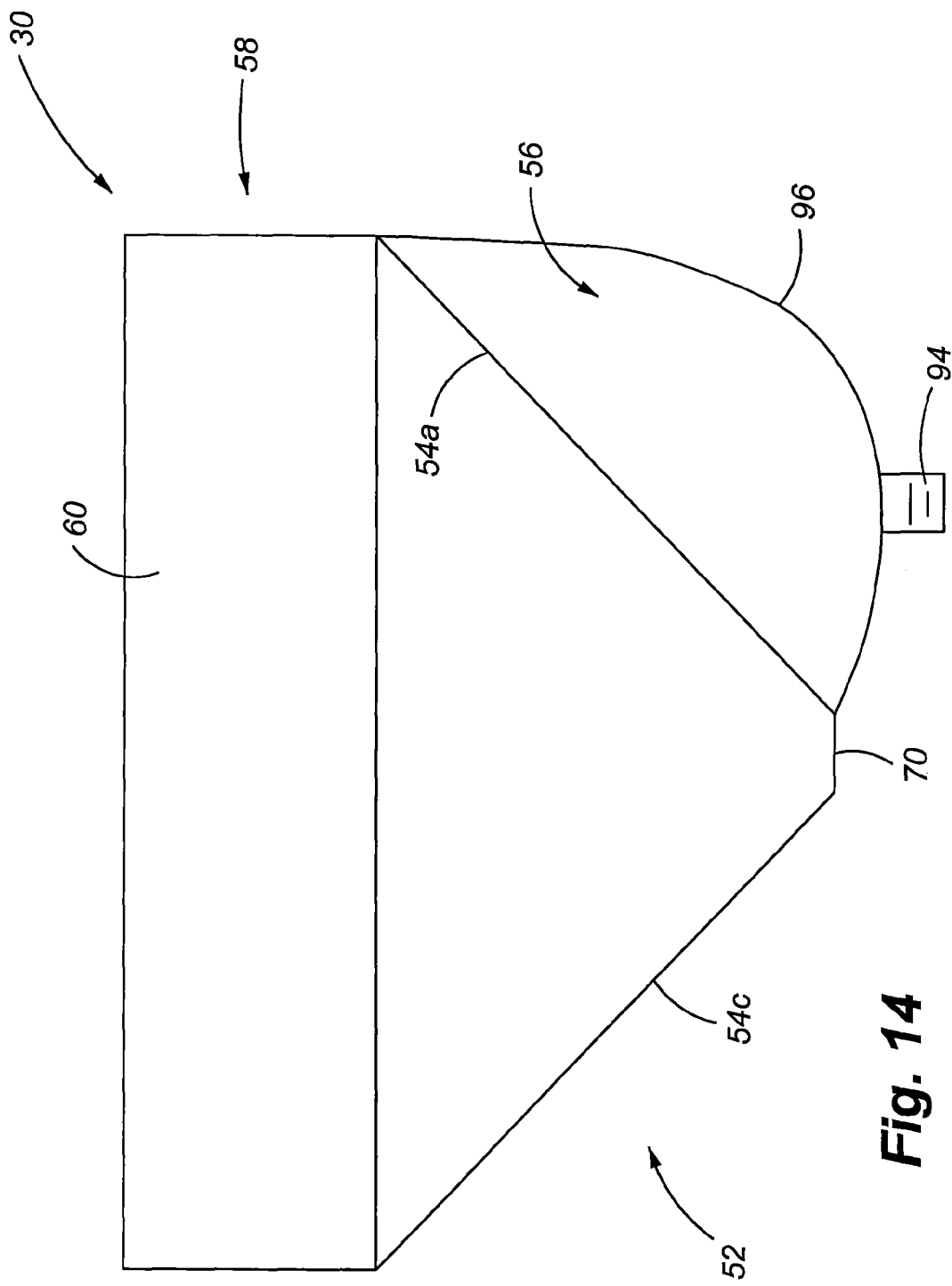

Referring now to FIG. 14, in yet a further modification to the current embodiment, a side elevation view of a product collection tank 30 is shown, wherein the flush chamber has a curved shape with a non-linear end piece 96 that is continuous and comprises a curved flush chamber bottom surface and a curved endwall. Thus, it is to be understood that the flush chamber 56 may take on a variety of shapes, and these are encompassed within the scope of the present invention.

Figure 15A:
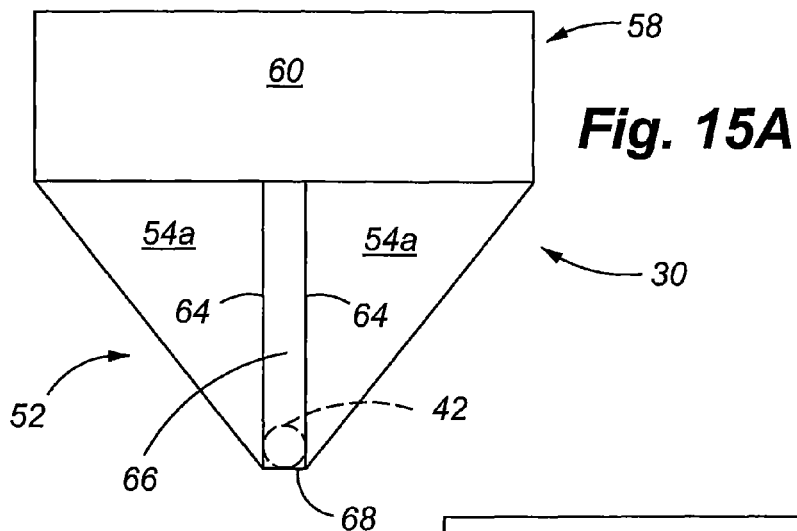
FIG. 15A is a front elevation view of the device shown in FIG. 2.
Figure 15B:
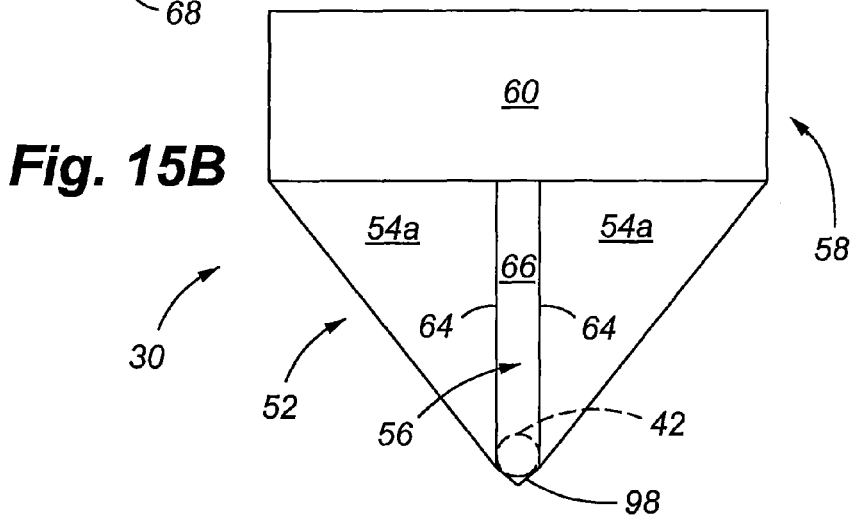
Figure 15C:
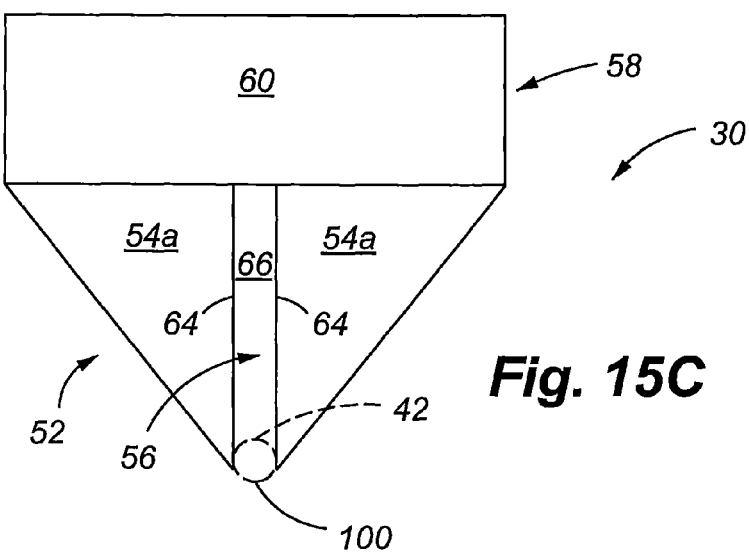

Referring now to FIG. 15A, a front elevation view of the product collection tank 30 of FIG. 1 is shown, wherein the flush chamber bottom surface 68 is substantially planar and wherein the sidewalls 64 are substantially vertical. Referring now to FIGS. 15B and 15C, modifications to the current embodiment are shown wherein the flush chamber bottom surface 98 is V-shaped (FIG. 15B), and wherein the flush chamber bottom surface 100 is curved (FIG. 15C). Referring now to FIGS. 15D and 15E, in still further possible modifications to the current embodiment, the sidewalls 102 can be substantially planar but sloping (FIG. 15D), or the sidewalls 104 can be curved (FIG. 15E). Thus, it is to be understood that the flush chamber 56 and its components may take on a variety of shapes, and these are encompassed within the scope of the present invention.

Finally, it is also to be understood that the various modifications presented above may in some cases be combined. For example, the product collection tank may have a pointed bottom with a substantially flat but shortened flush chamber bottom surface. Other combinations of the modifications are possible and not listed, but will be understood by a person skilled in the art. The other possible combinations are within the scope of the present invention.

While the above description and the drawings disclose and illustrate numerous alternative embodiments, one should understand, of course, that the invention is not limited to these embodiments. Those skilled in the art to which the invention pertains may make other modifications and other embodiments employing the principles of this invention, particularly upon considering the foregoing teachings. Therefore, by the appended claims, the applicant intends to cover any modifications and other embodiments as incorporate those features which constitute the essential features of this invention.

What is claimed is:

1. A method of measuring, dispensing, and delivering micro-ingredients to a feed ration, said method comprising:
    storing a quantity of a micro-ingredient;
    weighing the micro-ingredient;
    transferring the micro-ingredient to a product collection tank, wherein the product collection tank comprises an upper portion including an extension portion connected to a funnel like portion, and said extension portion being substantially vertical, a flush chamber protruding from the funnel like portion, said flush chamber having an end wall that is substantially co-planar with the upper portion and an outlet interconnected to the flush chamber; and
    activating a flush ring pump to provide a flush ring water to a flush ring connected to the product collection tank and activating a conveyance pump to convey the micro-ingredient.

2. A method, as claimed in claim 1, wherein:
    said conveyance pump includes two conveyance pumps.

3. A method as claimed in claim 1, wherein said flush chamber comprises about 10% of a width of said production collection tank.

4. A method as claimed in claim 1, wherein said flush ring comprises a front flush ring and a rear flush ring, said front and rear flush rings having a plurality of first perforations, said front flush ring further comprising a plurality of second perforations, wherein said second perforations provide at least a portion of the flush ring water to a sidewall of said flush chamber.

5. A method, as claimed in claim 1, wherein said sloping bottom surface comprises a bottom angle between about 1 to 10 degrees from horizontal.

6. A method, as claimed in claim 1, wherein:
    a side wall of said flush chamber is substantially vertical.

7. A method, as claimed in claim 1, wherein:
    said end wall of said flush chamber is substantially vertical.

8. A method, as claimed in claim 1, wherein:
    said flush chamber includes a pair of side walls interconnected by said end wall.

9. A method, as claimed in claim 1, wherein:
    said funnel like portion comprises a plurality of planer sloping surfaces.

10. A method, as claimed in claim 1, wherein:
    said flush chamber has a sloping bottom surface that slopes downward toward said outlet.

11. A method of measuring, dispensing and delivering micro-ingredients to a feed ration, comprising:
    storing a quantity of a micro-ingredient;
    weighing the micro-ingredient;
    transferring the micro-ingredient to a product collection tank, wherein the product collection tank comprises (i) an upper portion (ii) a funnel like portion, (iii) a flush chamber protruding from the funnel like portion, said flush chamber having an end wall that is substantially co-planar with the upper portion, and (iv) an outlet interconnected to the flush chamber;
    activating a flush ring pump to provide a flush ring water to a flush ring connected to the product collection tank and activating a conveyance pump to convey the micro-ingredient; and
    said flush chamber includes a pair of side walls and an end wall, said side walls and said end wall being orientated substantially vertical, and further wherein said side walls are substantially triangular shaped and said end wall is substantially rectangular shaped.

12. A method, as claimed in claim 11, wherein:
    said flush chamber has a sloping bottom surface that slopes downward toward said outlet.

* * * * *